Sept. 22, 1936. W. B. BRONANDER 2,054,802
VARIABLE SPEED DRIVING MECHANISM
Filed April 17, 1935

INVENTOR
Wilhelm B. Bronander
BY
Marshall Hawley
ATTORNEYS

Patented Sept. 22, 1936

2,054,802

UNITED STATES PATENT OFFICE 2,054,802

VARIABLE SPEED DRIVING MECHANISM

Wilhelm B. Bronander, Montclair, N. J.

Application April 17, 1935, Serial No. 16,749

8 Claims. (Cl. 74—282)

This invention relates to variable speed driving mechanisms.

This invention has for its salient object to provide a method and mechanism whereby a differential transmission may be operated by a plurality of driving units and the units may be controlled as to speed, rotation and direction of rotation in such a manner that the driven element may be driven at an infinite number of speeds in either direction, or may be driven at zero speed or be held stationary.

Another object of the invention is to provide a differential power transmission with a pair of driving units connected to different parts of the differential mechanism in such a way that when the units are rotating in opposite directions at the same speed no resultant drive will be obtained, when one unit is rotating faster than the other a reduced speed will be obtained, controlled by the rotation of the faster unit, and when both units are rotating in the same direction at the same speed a direct drive will be obtained.

Another object of the invention is to so couple a pair of internal combustion engines to a differential driving mechanism and to so regulate the operation of the engines as to direction and speed that the drive will be transmitted at a plurality of speeds in either direction.

Figure 1:
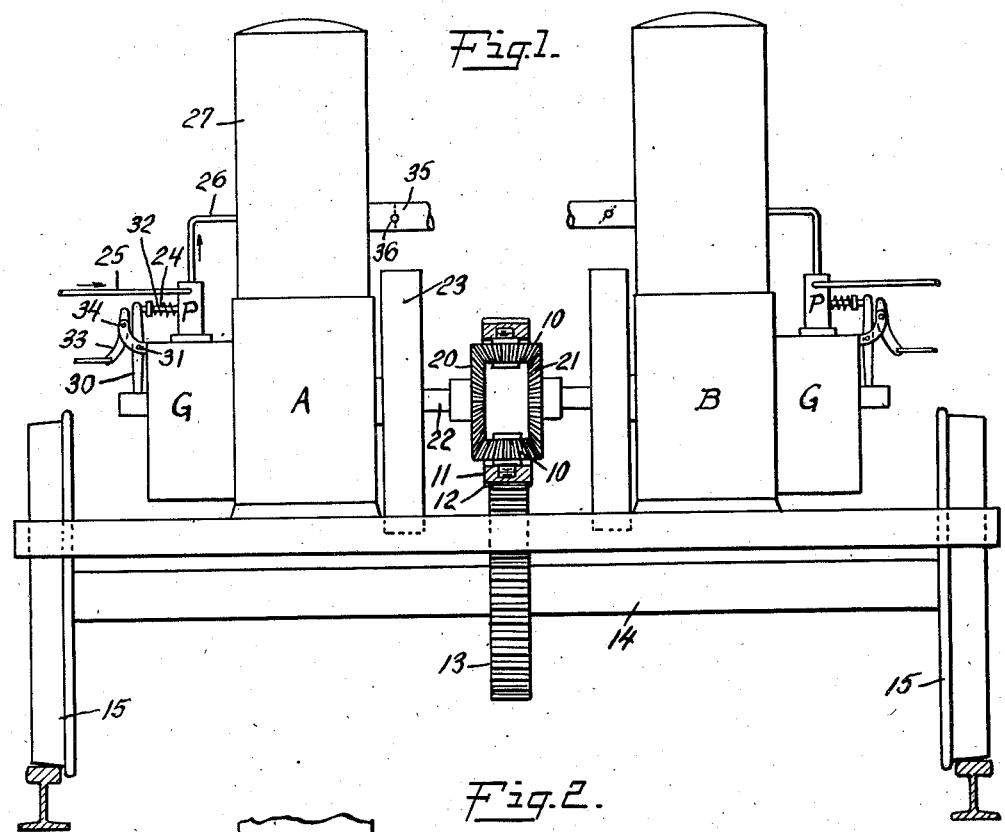
Figure 2:
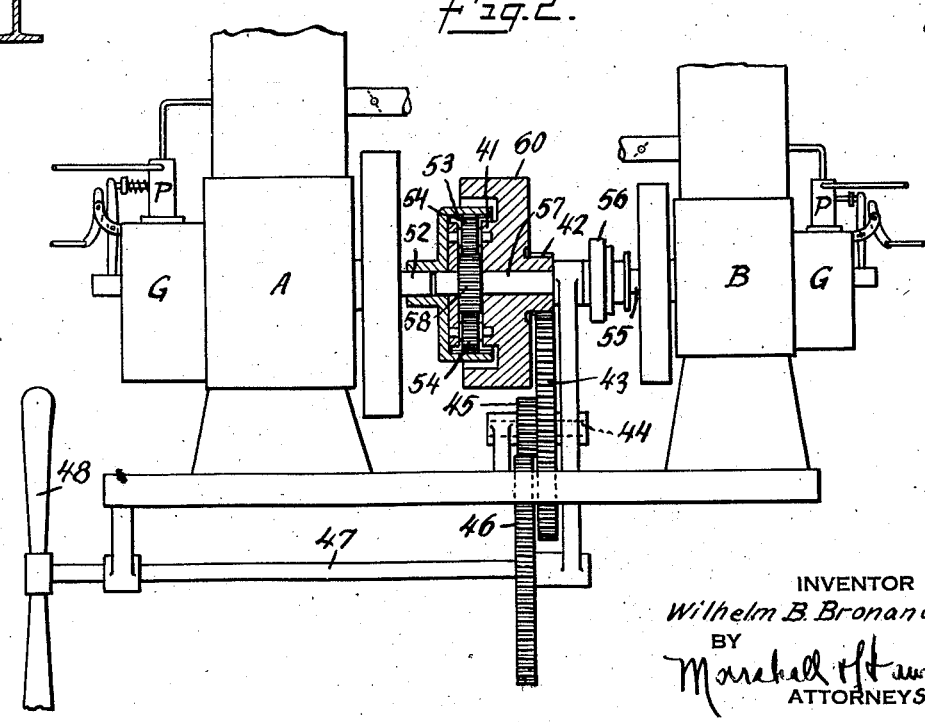

Further objects of the invention will appear from the following specification taken in connection with the drawing which forms a part of this application, and in which Fig. 1 is an elevational view illustrating a differential drive constructed in accordance with the invention, parts of the mechanism being shown in section; and Fig. 2 is an elevational view similar to Fig. 1 but illustrating another common form of planetary differential mechanism and also showing the driving units as of different sizes.

The invention briefly described consists of differential mechanism including a spider having planet gears mounted thereon and operatively connected to a driven shaft and a pair of gears meshing with said planet gears, each of said pair of gears being independently driven by a separate power unit, such as an internal combustion engine. Means is provided for controlling the operation of each power unit in such a way as to regulate the speed of operation of the unit or to prevent the operation of the unit. When one unit or engine is operating in a direction opposite to the direction of rotation of the other unit and the two units are operating at the same speed, no power will be transmitted through the differential mechanism or through the spider to the driven element. When the two units are driven in the same direction at the same speed a direct drive will be obtained. When one unit is rotating at a different speed than the other unit, the unit rotating at the higher speed will control the drive.

Further details of the invention will appear from the following description.

In the embodiment of the invention illustrated in Fig. 1 there is shown a differential gearing comprising planet gears 10, 10 carried by a spider 11 having a gear 12 formed or mounted thereon which meshes with a gear 13 mounted on the driven shaft 14 which, as shown, may drive the wheels 15, 15 of a railroad truck.

A pair of gears 20, 21 mesh with the planet gears 10, 10. The gear 20 is mounted on a shaft 22 of an engine unit A which is preferably an internal combustion engine, a Diesel type engine being shown. A fly wheel 23 is mounted on the shaft 22.

The speed of the engine A is controlled by a valve carried by a valve stem or rod 24 which controls the fuel fed through a conduit 25 to a fuel pump P, the fuel being discharged or fed by the pump through a conduit 26 to the engine cylinder 27. A governor G is mounted on the engine A and is constructed in any suitable manner to operate a lever 30 which is mounted on a fixed pivot 31 and engages the outer end of the valve stem 24. A spring 32 retracts the valve. The fuel feed may be manually controlled by means of a lever 33 mounted on a fixed pivot 34 and operating through the end of the lever 30 to push in the valve stem 24 and thus control the fuel supply. The engine exhaust conduit is shown at 35 and a valve 36 is mounted therein and is manually controlled to regulate the opening through the exhaust conduit. When the valve 36 is in the position shown, a back pressure will be built up in the engine and when this pressure has reached a predetermined amount further rotation of the engine will be prevented.

The engine B is connected to the gear 21 and is operated and controlled in the same manner and by the same mechanism as that above described.

The driving mechanism illustrated in Fig. 1 operates as follows: Both engines A and B are started up in the usual way, but one of these engines normally rotates in one direction and the other in the opposite direction. The governors G control the speed of the engine and when the two engines are operating in opposite directions at the same speed the spider will not be rotated and no drive will be effected. In order to propel the vehicle or drive the driven shaft one of the engines will be slowed down, thus causing one of the gears 20, 21 to be rotated slower than the other gear. This differential in the speed of rotation of the two gears will cause the spider to rotate, thus transmitting the drive to the gear 13 and shaft 14. The direction of drive will be controlled by the direction of rotation of the faster rotating engine. If one of the engines is stopped by cutting down the fuel feed and building up the back pressure by closing the valve 36, the other engine will drive the spider at half the speed of the driving engine.

In order to effect direct drive one of the engines, depending on the direction of rotation, as for instance, engine B, will be stopped in the manner above described and the other engine which is now driving the vehicle will be slowed down to a speed below the rate of rolling speed of the vehicle or the speed caused by the momentum of the rolling parts. This will cause the engine B to be turned over and started in the same direction of rotation as the engine A. Engine B will then be brought up to the speed of engine A and the spider 11 and gear 12 carried thereby will rotate at the same speed and in the same direction as the speed of rotation and direction of rotation of the engine shafts.

In order to reverse the drive the engine which is controlling the forward drive will be slowed down and stopped and the direction of rotation of the other engine will cause the drive to be reversed.

The construction shown in Fig. 2 is similar to that shown in Fig. 1 except that engine B is smaller than engine A and in this embodiment of the invention the spider 41 carries a gear 42 which meshes with a gear 43 on a stub shaft 44. This shaft also carries a gear 45 which meshes with a gear 46 on a shaft 47 to which is secured a propeller 48.

The shaft 52 of engine A has secured thereto a ring gear 53 which engages planet gears 54 carried by the spider 41. The shaft 55 of the engine B is connected through a clutch 56 which may be manually controlled in any suitable manner to a shaft 57 on which is mounted a pinion 58 which also meshes with the planet gears 54. A fly wheel 60 is formed on or secured to the spider 41.

The clutch 56 is provided so that the smaller engine B may be used to start the larger engine A or, in other words, as a starting motor.

The two engines A and B are controlled in the same manner as those illustrated in Fig. 1. In this form of the invention the engine A will be normally rotated in a direction to give a forward drive to the shaft 47.

The arrangement shown in Fig. 2 is operated in the same manner as that shown in Fig. 1 and can accomplish the same resultant drives.

From the foregoing specification it will be seen that the rotation of the driven shaft is controlled by the regulation and control of the driving units A and B and that by controlling these units in the manner above described an infinite number of speeds can be obtained and that the drive can be easily and quickly changed from neutral or no drive to any desired forward or reverse speed. It will be understood that, although internal combustion engines are illustrated and are preferred in carrying out this method and driving control, that other power units could be utilized and would accomplish the same results.

Although certain specific embodiments of the invention have been particularly shown and described, it will be understood that the invention is capable of modification and that changes in the construction and in the arrangement of the various cooperating parts may be made without departing from the spirit or scope of the invention, as expressed in the following claims.

What I claim is:

1. Driving mechanism comprising a planet gear spider, planet gears mounted thereon, a driven shaft operatively connected to said spider, a pair of gears meshing with said planet gears, an internal combustion, Diesel type engine connected to drive each of said pair of gears, means for controlling the speed of each engine, and means for controlling the exhaust of each engine in a manner to substantially close the exhaust conduit and build up back pressure to slow down or stop the engine whereby the driving engine will reverse the drive of the other engine and cause both engines to drive in the same direction.

2. The method of driving a driven shaft and parts connected thereto through differential gearing, including planet gears carried by a spider and a pair of gears meshing therewith which consists of separately and independently driving each gear of said pair of gears by an internal combustion engine, operating said engines in opposite directions at different speeds, from zero speed to maximum speed, to obtain a drive below the speed of the driving engine, and changing from said drive to direct drive by driving one engine while the other is substantially stationary, then reducing momentarily the speed of the driven engine so that the rotation of the driven parts, due to momentum, will rotate and start the stationary engine and rotate both engines in the direction of rotation of the operating engine.

3. The method of driving a driven shaft and parts connected thereto to obtain infinitely variable speeds in either direction through differential gearing, including planet gears carried by a spider and a pair of gears meshing therewith, which consists of separately and independently driving each gear of said pair of gears by an internal combustion engine, using one of said engines as a drag to retard the rotation of the gear connected thereto while driving the gearing by the other engine, to obtain a drive at a speed below the speed of the driving engine and obtaining direct drive by reversing the direction of rotation of the "drag" engine by momentarily reducing the speed of the driving engine and utilizing the momentum of the driven parts to start the "drag" engine and drive both engines in the same direction.

4. The method of reversing one of two differentially interconnected engines which consists of utilizing the kinetic energy generated by driving one engine against the resistance of the other engine to force both engines to rotate in the same direction.

5. The method of obtaining direct drive from two differentially interconnected, Diesel type engines which consists of utilizing the kinetic energy generated by driving one engine against the resistance of the other engine to force both engines to rotate in the same direction.

6. The method of changing from infinitely variable drives below direct drive to direct drive with two differentially interconnected engines which consists of utilizing the kinetic energy generated by driving one engine against the resistance of the other engine to force both engines to drive in the same direction.

7. The method of driving a driven shaft through differential mechanism, including a pair of differential elements and a third differential element operatively connected to said pair of elements, which consists of separately and independently driving each of said pair of differential elements by an internal combustion engine, using one of said engines as a drag to retard the rotation of the differential element connected thereto while driving the differential mechanism by the other engine, to obtain a drive at a speed below the speed of the driving engine and obtaining direct drive by reversing the direction of rotation of the "drag" engine by momentarily reducing the speed of the driving engine and utilizing the momentum of the driven parts to start the "drag" engine and drive both engines in the same direction.

8. In combination, a pair of internal combustion, Diesel engines, a shaft driven by each engine, each engine having a fuel intake and an exhaust, fuel control means for each engine, means to close the exhaust of each engine, said differential mechanism including three differential elements, one of said elements being operatively connected to each of said engine shafts, a driven shaft connected to the third differential element whereby either engine may be slowed down and used as a drag by closing the exhaust thereof and the direction of rotation of said drag engine can be reversed by utilizing the momentum of the driven parts.

WILHELM B. BRONANDER.